[22.] John & Michael Broderick's Improvement in Tilt-Wagon.
No. 118,841. Patented Sep. 12, 1871.
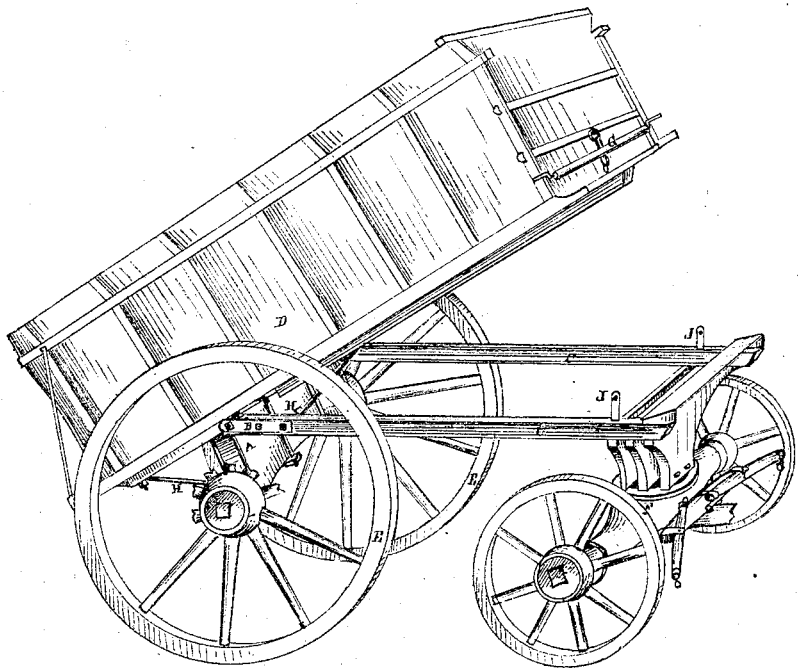
Witnesses;
E. F. Huyck
P. McCamm.
Inventor.
John Broderick
Michael Broderick

UNITED STATES PATENT OFFICE.

JOHN BRODERICK AND MICHAEL BRODERICK, OF LOUISVILLE, KENTUCKY.

IMPROVEMENT IN DUMPING-WAGONS.

Specification forming part of Letters Patent No. 118,841, dated September 12, 1871.

*To all whom it may concern:*

Be it known that we, JOHN BRODERICK and MICHAEL BRODERICK, of Louisville, in the county of Jefferson and State of Kentucky, have invented certain Improvements in Dumping-Wagons; and we do hereby declare that the following is a full, clear, and exact description thereof, reference being had to the annexed drawing making a part of this specification.

The figure shows our improved dumping-wagon in perspective, representing the box in the act of tilting.

This invention relates to four-wheeled dumping-wagons; and its object is to construct the running-gear in such a manner that the body or box may be operated automatically by the action of the draught-animals upon the front axle. Our improvement consists in elevating the box by any suitable contrivance, to which it is also permanently secured, some distance above the journals of the hind axle, upon which, or with which, it is turned, whereby a lever-arm is obtained, to which the longitudinal beams of the elevated frame on the front axle are pivoted, so that when the hind wheels of the wagon are backed up to a curb or other obstruction the box, on uncoupling it from the frame on the front axle, will be tilted by said frame on continuing to back the front truck, and will also be returned to its horizontal position on again pulling the front truck forward.

As illustrated in the drawing, which shows one mode of carrying our invention into practice, the body or box D is mounted and permanently secured upon the cross-bars of an elevated bolster, A, fixed to the hind axle by means of stirrup-bolts or other suitable devices. The front truck F swivels in the ordinary manner on the frame which connects it with the hind axle or truck. This frame is elevated by means of bolsters so as to bring its longitudinal beams C C into a horizontal line with the cross-bars on the bolster A on the rear axle, to which cross-bars the beams C C are pivoted at B. In its horizontal position the forward end of the box D is supported upon the frame on the front axle, and secured thereto by slipping a bar, G, through the eyes of upright lugs J J, which extend through mortises in the projecting ends of the side bars of the box. For this purpose any other preferred contrivances may be used. The frame on the front axle is sufficiently high to permit the wheels of the truck F to turn under it. The connection between the box and its elevated supporting devices may be strengthened by braces H H, if found desirable. The box, when in its horizontal position and fastened to the lugs J J, makes the connection between the elevated bolster on the rear axle and the frame upon the forward axle a rigid one, so that the wagon may be backed up to a curb in the usual way; but the moment the box is uncoupled and the backing continued, while the rear wheels are blocked by the curb, the side bars C will, as the front truck approaches the rear one, oscillate or tilt the bolster A, together with the box, and cause the load to be discharged or dumped; and on again drawing the front truck forward the bars C will return the bolster A to its vertical position, which throws the box into its horizontal position.

It will be apparent that, instead of using the elevated bolster upon the hind axle, the latter may be cranked and the box attached to it directly; or other means may be used for elevating the box above the fulcrum upon which it turns to obtain a leverage upon it.

We therefore wish it to be distinctly understood that we do not limit our claim to the precise construction and disposition of the parts as shown and described, but lay claim to any four-wheeled dumping-wagon in which the rear truck is hinged to the forward truck in such a manner that the latter, by approaching the former or receding from it, may operate the box in dumping the load and in returning it to its horizontal position.

What we claim as our invention, and desire to secure by Letters Patent, is—

A dumping-wagon, the trucks of which are coupled together by a jointed and elevated frame for supporting and operating the box, substantially as set forth.

JOHN BRODERICK.
MICHAEL BRODERICK.

Witnesses:
   E. F. HUYCK,
   P. MCCANN.